3,278,539
HEXAHYDRO-9-ACRIDANONES
Joseph Albert Meschino, North Wales, Pa., assignor to McNeil Laboratories, Incorporated, a corporation of Pennsylvania
No Drawing. Filed Jan. 21, 1965, Ser. No. 427,134
19 Claims. (Cl. 260—279)

This invention relates to hexahydro-9-acridanones having the formula

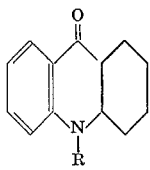

wherein R is a member of the group consisting of loweralkyl, aminoloweralkyl and diloweralkylaminoloweralkyl, and the nontoxic, therapeutically active acid addition salts thereof.

The term "loweralkyl" includes alkyl groups containing 1 to 7 carbon atoms, including saturated aliphatic chains, straight or branched, such as methyl, ethyl, propyl, isopropyl, n-butyl, isobutyl, isopentyl, hexyl, etc.

The term "loweralkyl" in the terms "aminoloweralkyl" and "diloweralkylaminoloweralkyl" includes alkyl groups containing 1 to 3 carbon atoms, including saturated aliphatic chains, straight or branched, such as methyl, ethyl, propyl and isopropyl.

The aminoloweralkylacridanones and the diloweralkylaminoloweralkylacridanones of this invention may be converted to their acid addition salts by reaction with an appropriate acid such as hydrochloric, sulfuric, acetic, maleic, fumaric acids, etc.

The compounds of this invention absorb ultra violet light and are useful as sun-screening materials in salves and ointments. In addition, because of their solubility in organic materials generally, they may be used as ultra violet absorbers in plastics and resins, such as polystyrene, polyethylene, polypropylene (methacrylate resins, polyacylamides, polyacrylonitrile fibers), polyamide fibers (nylon e.g.) and polyester fibers. In the latter use, the inclusion of 0.01 to 5 percent of the absorber, based on the polymer weight, is sufficient to render protection against ultra violet light, such as in plastic film or light filters. The absorber may be incorporated in the mixture of monomers before polymerization to form the polymer or it may be incorporated in the polymer at any stage during its handling, as by milling into the polymer with other compounding ingredients or during the spinning of polymers into fibers, etc.

Certain of the compounds of this invention, for example, 1,2,3,4,4a,9a - hexahydro - 10 - dimethylaminoethyl-9-acridanone and 1,2,3,4,4a,9a - hexahydro - 10 - dimethylaminopropyl-9-acridanone, possess hypotensive activity in varying degree.

The novel compounds of this invention may be prepared by reducing the appropriate 1,2,3,4-tetrahydro-10-R-9-acridanones with a reducing agent such as an alkali metal aluminum hydride, for example, lithium aluminum hydride or a hydrogen-liberating system, such as tin in hydrochloric acid. For the lithium agent, a suitable solvent such as an ether, for example, diethylether, diethyleneglycoldimethyl ether, tetrahydrofuran or dioxane may be used.

The starting materials for the preparation of the 1,2,3,4,4a,9a-hexahydro-10-R-9-acridanones may be prepared by reacting the appropriately substituted anthranilic acids with cyclohexanone as described for example, by H. Tiedtke, Ber. 42, 621 (1909).

The following examples are intended to illustrate but not to limit the scope of the present invention.

*Example I*

To a suspension of 0.5 g. of 1,2,3,4-tetrahydro-10-methyl-9-acridanone in 150 ml. of tetrahydrofuran is added dropwise an ethereal solution of lithium aluminum hydride (ca. 0.5 g. in 10 ml. of ether) until all the starting material is dissolved leaving a clear, bright yellow solution. The excess hydride is immediately decomposed with 1.5 ml. of water. After filtration, the solution is concentrated to dryness under vacuum leaving 1,2,3,4,-4a,9a-hexahydro-10-methyl-9-acridanone as a yellow viscous oil which soon crystallizes to a solid, M.P. 68–72° C.

*Example II*

To a suspension of 3.0 g. of lithium aluminum hydride in 50 ml. of tetrahydrofuran is added dropwise a solution of 12 g. of 1,2,3,4-tetrahydro-10-dimethylaminoethyl-9-acridanone in 150 ml. of the same solvent. After stirring at room temperature for 8 hours the reaction mixture is treated with water, filtered and evaporated to dryness. The semi-crystalline product is chromatographed on aluminum oxide and the yellow product is eluted with ether. The 1,2,3,4,4a,9a - hexahydro-10-dimethylaminoethyl-9-acridanone is then converted to the maleate salt, M.P. 175–178° C.

*Example III*

To a stirred solution of 5.0 g. of 1,2,3,4-tetrahydro-10-dimethylaminopropyl-9-acridanone in a mixture of 20 ml. of tetrahydrofuran and 50 ml. of ether is added dropwise an ether solution (ca. 0.002 molar) of lithium aluminum hydride. The temperature is maintained at 25 to 30° C. by external cooling if necessary. After a few minutes, a second phase appears which slowly goes back into solution as more hydride is added. Addition of hydride solution is stopped when its further addition does not produce a visual change (clouding at the site of initial contact) in the reaction mixture. Stirring is continued for 30 minutes longer after which the mixture is hydrolyzed with water. Filtration and concentration leaves a yellow oil which is then chromatographed on 150.0 g. of aluminum oxide with 1 percent methanol in ether as eluent. 1,2,3,4,4a,9a - hexahydro - 10 - dimethylamniopropyl-9-acridanone is obtained as a yellow oil which is converted to a hydrochloride, M.P. 202–207° C.

*Example IV*

Using the procedure of Example I and replacing 1,2,3,4-tetrahydro-10-methyl-9-acridanone with an equivalent amount of one of the following 1,2,3,4-tetrahydro-10-ethyl-9-acridanone
1,2,3,4-tetrahydro-10-propyl-9-acridanone
1,2,3,4-tetrahydro-10-isopropyl-9-acridanone
1,2,3,4-tetrahydro-10-(n-butyl)-9-acridanone
1,2,3,4-tetrahydro-10-isobutyl-9-acridanone
1,2,3,4-tetrahydro-10-isopentyl-9-acridanone
1,2,3,4-tetrahydro-10-hexyl-9-acridanone
1,2,3,4-tetrahydro-10-heptyl-9-acridanone the corresponding 1,2,3,4-4a,9a-hexahydro-10-loweralkyl-9-acridanone is obtained, for example, 1,2,3,4,4a,9a-hexahydro-10-ethyl-9-acridanone
1,2,3,4,4a,9a-hexahydro-10-propyl-9-acridanone
1,2,3,4,4a,9a-hexahydro-10-isopropyl-9-acridanone 1,2,3,4,4a,9a-hexahydro-10-(n-butyl)-9-acridanone
1,2,3,4,4a,9a-hexahydro-10-isobutyl-9-acridanone
1,2,3,4,4a,9a-hexahydro-10-isopentyl-9-acridanone
1,2,3,4,4a,9a-hexahydro-10-hexyl-9-acridanone
1,2,3,4,4a,9a-hexahydro-10-heptyl-9-acridanone

*Example V*

Using the procedure of Example II and replacing 1,2,3,4 - tetrahydro-10-dimethylaminoethyl-9-acridanone with an equivalent amount of one of the following 1,2,3,4-tetrahydro-10-dimethylaminomethyl-9-acridanone
1,2,3,4-tetrahydro-10-aminoisopropyl-9-acridanone
1,2,3,4-tetrahydro-10-aminopropyl-9-acridanone
1,2,3,4-tetrahydro-10-aminoethyl-9-acridanone
1,2,3,4-tetrahydro-10-diethylaminomethyl-9-acridanone
1,2,3,4-tetrahydro-10-diethylaminopropyl-9-acridanone
1,2,3,4-tetrahydro-10-diisopropylaminoethyl-9-acridanone
1,2,3,4-tetrahydro-10-diisopropylaminopropyl-9-acridanone
1,2,3,4-tetrahydro-10-dimethylaminoisopropyl-9-acridanone
1,2,3,4-tetrahydro-10-diisopropylaminoisopropyl-9-acridanone the corresponding 1,2,3,4,4a,9a-hexahydro - 10 - diloweraminoalkyl-9-acridanone or 1,2,3,4,4a,9a-hexahydro-10-aminoloweralkyl-9-acridanone is obtained, for example, 1,2,3,4,4a,9a-hexahydro-10-dimethylaminomethyl-9-acridanone
1,2,3,4,4a,9a-hexahydro-10-aminoisopropyl-9-acridanone
1,2,3,4,4a,9a-hexahydro-10-aminopropyl-9-acridanone
1,2,3,4,4a,9a-hexahydro-10-aminoethyl-9-acridanone
1,2,3,4,4a,9a-hexahydro-10-diethylamniomethyl-9-acridanone
1,2,3,4,4a,9a-hexahydro-10-diethylaminopropyl-9-acridanone
1,2,3,4,4a,9a-hexahydro-10-diisopropylaminoethyl-9-acridanone
1,2,3,4,4a,9a-hexahydro-10-diisopropylaminopropyl-9-acridanone
1,2,3,4,4a,9a-hexahydro-10-dimethylaminoisopropyl-9-acridanone
1,2,3,4,4a,9a-hexahydro-10-diisopropylaminoisopropyl-9-acridanone

What is claimed is:

1. A member selected from the group of hexahydro-9-acridanones having the formula

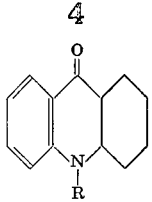

wherein R is a member selected from the group consisting of loweralkyl, aminoloweralkyl and diloweralkylaminoloweralkyl, and the non-toxic, therapeutically active acid addition salts thereof.

2. 1,2,3,4,4a,9a-hexahydro-10-methyl - 9 - acridanone.
3. 1,2,3,4,4a,9a-hexahydro-10 - ethyl - 9 - acridanone.
4. 1,2,3,4,4a,9a-hexahydro - 10 - propyl-9-acridanone.
5. 1,2,3,4,4a,9a-hexahydro-10 - isopropyl-9-acridanone.
6. 1,2,3,4,4a,9a-hexahydro - 10 - (n-butyl) - 9 - acridanone.
7. 1,2,3,4,4a,9a-hexahydro-10 - isobutyl-9-acridanone.
8. 1,2,3,4,4a,9a-hexahydro-10 - isopentyl-9-acridanone.
9. 1,2,3,4,4a,9a-hexahydro - 10 - hexyl-9-acridanone.
10. 1,2,3,4,4a,9a-hexahydro - 10 - heptyl-9-acridanone.
11. 1,2,3,4,4a,9a-hexahydro - 10-dimethylaminoethyl-9-acridanone.
12. 1,2,3,4,4a,9a-hexahydro - 10-dimethylaminopropyl-9-acridanone.
13. 1,2,3,4,4a,9a-hexahydro - 10-diethylaminoethyl-9-acridanone.
14. 1,2,3,4,4a,9a-hexahydro - 10 - diisopropylaminoethyl-9-acridanone.
15. 1,2,3,4,4a,9a-hexahydro - 10-diisopropylaminopropyl-9-acridanone.
16. 1,2,3,4,4a,9a-hexahydro - 10 - dimethylaminoisopropyl-9-acridanone.
17. 1,2,3,4,4a,9a hexahydro - 10-diisopropylaminoisopropyl-9-acridanone.
18. 1,2,3,4,4a,9a-hexahydro - 10 - aminopropyl-9-acridanone.
19. 1,2,3,4,4a,9a-hexahydro - 10 - aminoisopropyl-9-acridanone.

References Cited by the Examiner
UNITED STATES PATENTS
3,067,137  12/1962  Schmulling ____ 260—279 XR ALEX MAZEL, *Primary Examiner.*

HENRY R. JILES, DONALD G. DAUS,
*Assistant Examiners.*